United States Patent
Kinuta et al.

(10) Patent No.: US 12,556,028 B2
(45) Date of Patent: Feb. 17, 2026

(54) UNINTERRUPTIBLE POWER SUPPLY

(71) Applicant: FUJI ELECTRIC CO., LTD., Kawasaki (JP)

(72) Inventors: Takahiro Kinuta, Hino (JP); Seiitsu Kin, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 23 days.

(21) Appl. No.: 18/396,043

(22) Filed: Dec. 26, 2023

(65) Prior Publication Data

US 2024/0356367 A1 Oct. 24, 2024

Related U.S. Application Data

(63) Continuation of application No. PCT/JP2022/047119, filed on Dec. 21, 2022.

(30) Foreign Application Priority Data

Jan. 7, 2022 (JP) .................................. 2022-001943

(51) Int. Cl.
*H02J 9/06* (2006.01)
(52) U.S. Cl.
CPC .................................... *H02J 9/062* (2013.01)
(58) Field of Classification Search
CPC ....................................................... H02J 9/062
(Continued)

(56) References Cited

U.S. PATENT DOCUMENTS

| 6,967,283 B2 * | 11/2005 | Rasmussen | G06F 1/189 361/600 |
| 2005/0036253 A1 * | 2/2005 | Tian | H02J 9/062 361/66 |

(Continued)

FOREIGN PATENT DOCUMENTS

| JP | H08-111943 A | 4/1996 |
| JP | 2013-090468 A | 5/2013 |

(Continued)

OTHER PUBLICATIONS

PCT/ISA/210, "International Search Report for PCT International Application No. PCT/JP2022/047119," Jan. 31, 2023.

(Continued)

*Primary Examiner* — Michael R. Fin
(74) *Attorney, Agent, or Firm* — HAUPTMAN HAM, LLP

(57) ABSTRACT

An uninterruptible power supply according to this invention includes an uninterruptible-power-supply module including a power conversion housing accommodating a power converter. The uninterruptible power supply includes a bus part arranged outside the power conversion housing of the uninterruptible-power-supply module, and configured to deliver input/output power from/to the uninterruptible-power-supply modules. Also, the uninterruptible power supply includes a module interrupter provided between the uninterruptible-power-supply module and the bus part and configured to electrically entirely disconnect the uninterruptible-power-supply module from the bus part. Also, the uninterruptible power supply includes a bypass circuit part including a switching circuit for switching electrical conduction, and configured to supply AC power from a bypass AC power supply to the load without connection through the uninterruptible-power-supply module.

15 Claims, 5 Drawing Sheets

(58) Field of Classification Search
USPC .......................................................... 307/66
See application file for complete search history.

(56) References Cited

U.S. PATENT DOCUMENTS

| | | |
|---|---|---|
| 2016/0366781 A1 | 12/2016 | Paatero |
| 2019/0165552 A1 | 5/2019 | Kin et al. |
| 2020/0177021 A1* | 6/2020 | Abe .................. H02J 9/062 |
| 2023/0411990 A1* | 12/2023 | Nakamura ............. H02M 5/45 |

FOREIGN PATENT DOCUMENTS

| | | |
|---|---|---|
| JP | 6191745 B1 | 9/2017 |
| JP | 2021-151052 A | 9/2021 |

OTHER PUBLICATIONS

PCT/ISA/237, "Written Opinion for PCT International Application No. PCT/JP2022/047119," Jan. 31, 2023.
Japan Patent Office, "Office Action for Japanese Patent Application No. 2022-001943," Jun. 28, 2022.

* cited by examiner

UNINTERRUPTIBLE POWER SUPPLY

CROSS-REFERENCE TO RELATED APPLICATION

This application is a continuation application of PCT application PCT/JP2022/047119, filed on Dec. 21, 2022, which claims priority of Japanese Patent Application No. 2022-001943 filed on Jan. 7, 2022, disclosure of which is herein incorporated.

BACKGROUND OF THE INVENTION

Field of the Invention

The present invention relates to an uninterruptible power supply, and particularly to an uninterruptible power supply including an uninterruptible-power-supply module.

Description of the Background Art

Uninterruptible power supplies including an uninterruptible-power-supply module are known in the art. Such an uninterruptible power supply is disclosed in Japanese Patent No. JP 6191745, for example.

The uninterruptible power supply described in the above Japanese Patent No. JP 6191745 includes an I/O module and a plurality of uninterruptible-power-supply modules. The plurality of uninterruptible-power-supply modules is arranged adjacent to each other in a leftward/rightward direction. The I/O module is arranged adjacent to the uninterruptible-power-supply modules in the leftward/rightward direction. In the uninterruptible power supply, the plurality of uninterruptible-power-supply modules and the I/O module are connected to each other through input and output buses as coupling members. The input and output buses pass through openings formed in top surfaces of the I/O modules, and are connected to an AC power supply and a load. The input and output buses are arranged across the plurality of uninterruptible-power-supply modules and the I/O module. The uninterruptible-power-supply module includes input and output switches, and a power converter. In the uninterruptible-power-supply module, AC power supplied from the AC power supply to the I/O module is input to the input switches through the input buses and converted by the power converter. The converted power is then output from the output switches to the output buses and supplied to the load through the I/O modules. The I/O module includes a direct transmission circuit. The direct transmission circuit includes thyristor and mechanical switches, and connects the AC power supply to the load without connection through the power converter.

However, in the above Japanese Patent No. JP 6191745, because the input and output buses extend over across the plurality of uninterruptible-power-supply modules and the I/O module, even when power from the AC power supply is directly supplied to the load by using the direct transmission circuit of the I/O module without connection through the power converter, power is being supplied to the input and output buses in the uninterruptible-power-supply modules. For this reason, even if the input and output switches in the uninterruptible power supply are turned off, AC power is supplied to the input and output buses that extend in the uninterruptible-power-supply module, and as a result internal circuitry of the uninterruptible-power-supply module cannot be brought in zero voltage. In a case in which the uninterruptible-power-supply module is entirely replaced, in order to entirely bring internal circuitry of the uninterruptible-power-supply module in zero voltage, because power from the AC power supply is necessarily stopped, it is necessary to stop supplying the power to the load. Consequently, an uninterruptible power supply that can entirely replace the uninterruptible-power-supply module while supplying power to the load is desired.

SUMMARY OF THE INVENTION

The present invention is intended to solve the above problems, and one object of the present invention is to provide an uninterruptible power supply capable of entirely replacing an uninterruptible-power-supply module while supplying power to a load.

In order to attain the aforementioned object, an uninterruptible power supply according to an aspect of the present invention: includes an uninterruptible-power-supply module that includes a power converter configured to convert AC power supplied from an AC power supply outside the uninterruptible power supply and to supply the converted AC power to a load outside the uninterruptible power supply, and a power conversion housing accommodating the power converter; a bus part that is arranged outside the power conversion housing of the uninterruptible-power-supply module, and is configured to deliver input/output power from/to the uninterruptible-power-supply modules; a module interrupter that is provided between the uninterruptible-power-supply module and the bus part, and is configured to electrically entirely disconnect the uninterruptible-power-supply module from the bus part; and a bypass circuit part that includes a switching circuit for switching electrical conduction, and is configured to supply AC power from a bypass AC power supply to the load without connection through the uninterruptible-power-supply module.

In the uninterruptible power supply according to the aforementioned aspect of the present invention, the module interrupter that is provided between the uninterruptible-power-supply module and the bus part and configured to electrically entirely disconnect the uninterruptible-power-supply module from the bus part, and the bypass circuit part that includes a switching circuit for switching electrical conduction, and is configured to supply AC power from a bypass AC power supply to the load without connection through the uninterruptible-power-supply module are provided. According to this configuration, because the uninterruptible-power-supply module can be electrically entirely disconnected from the bus part by the module interrupter while power is supplied to the load by the bypass circuit part, it is possible to entirely bring internal circuitry of the uninterruptible-power-supply module in zero voltage without stopping supplying the power to the load. Consequently, the uninterruptible-power-supply module can be entirely replaced while power is supplied to the load.

In the uninterruptible power supply according to the aforementioned aspect, a housing-accommodating part that is configured to replaceably accommodate the uninterruptible-power-supply module, and includes the bus part and the module interrupter is preferably further provided. According to this configuration, because the bus part and the module interrupter are included in the housing-accommodating part configured to replaceably accommodate the uninterruptible-power-supply module, the uninterruptible-power-supply module can be easily replaced with the bus part and the load being connected to each other outside the uninterruptible-power-supply module. As a result, in a case in which the uninterruptible-power-supply module is replaced, the load can be reliably continuously supplied with power outside the uninterruptible-power-supply module.

In this configuration, it is preferable that the bypass circuit part is arranged in the housing-accommodating part; and the switching circuit of the bypass circuit part includes an uninterruptible switching circuit that is configured to switch between supplying AC power from the uninterruptible-power-supply module to the load and supplying AC power from the bypass AC power supply to the load without connection through the uninterruptible-power-supply module while preventing instantaneous interruption of power supplied to the load. According to this configuration, because the bypass circuit part includes the uninterruptible switching circuit, even if a fault occurs in the power converter during power supply through the power converter to the load, AC power from the bypass AC power supply can be supplied to the load while preventing instantaneous interruption of power supplied to the load. Also, because the uninterruptible switching circuit of the bypass circuit part is provided in the housing-accommodating part outside the uninterruptible-power-supply module, dissimilar to a case in which the bypass circuit part provided inside the uninterruptible-power-supply module, the uninterruptible-power-supply module can be replaced while the load is continuously supplied with power without additionally providing a bypass circuit for maintenance/inspection in the housing-accommodating part. Consequently, it is possible to prevent complication of a circuit configuration that allows replacement of the uninterruptible-power-supply module while power is supplied to the load.

In the aforementioned uninterruptible power supply in which the bypass circuit part is arranged in the housing-accommodating part, it is preferable that the housing-accommodating part includes a switching circuit interrupter configured to electrically disconnect the switching circuit from the bypass circuit part; and the switching circuit is configured to be replaceable when being electrically disconnected by the switching circuit interrupter. According to this configuration, in a case in which AC power from the power converter of the uninterruptible-power-supply module is supplied to the load, the switching circuit of the bypass circuit part can be electrically disconnected in the housing-accommodating part by the switching circuit interrupter. Consequently, the switching circuit can be replaced while AC power is continuously supplied through the power converter to the load.

In this configuration, it is preferable that the bypass circuit part include a plurality of switching circuits as the switching circuit, and a plurality of switching circuit interrupters each of which is configured to electrically disconnect each of the plurality switching circuits as the switching circuit interrupter. According to this configuration, because the bypass circuit part includes a plurality of switching circuits, even if an fault occurs in the one of the plurality of switching circuits, other switching circuit in which no fault occurs can be used to switch between supplying AC power from the uninterruptible-power-supply module to the load and supplying AC power from the bypass AC power supply to the load without connection through the uninterruptible-power-supply module while preventing instantaneous interruption of power supplied to the load. Consequently, the uninterruptible power supply can be more stably operated by providing the plurality of switching circuits to the bypass circuit part.

In the aforementioned uninterruptible power supply in which the housing-accommodating part provided, it is preferable that a plurality of uninterruptible-power-supply modules is provided as the uninterruptible-power-supply module; the plurality of uninterruptible-power-supply modules is arranged adjacent to each other in a leftward/rightward direction in the housing-accommodating part; and a plurality of module interrupters is provided as the module interrupter corresponding to the plurality of uninterruptible-power-supply modules. According to this configuration, because a plurality of uninterruptible-power-supply modules is provided, even if a fault occurs in the one of the plurality of uninterruptible-power-supply modules, AC power can be supplied to the load by converting AC power by using other uninterruptible-power-supply module in which no fault occurs. In some cases, the power converter of the uninterruptible-power-supply module may be operated as an active filter serving to reduce a reactive current and a harmonic current generated by the load while supplying AC power from the bypass AC power supply through the bypass circuit part to the load. Even in such a case, because the plurality of uninterruptible-power-supply modules is provided, by electrically disconnecting only one of the plurality of uninterruptible-power-supply modules, the disconnected uninterruptible-power-supply module can be replaced while other uninterruptible-power-supply modules, which are not disconnected, are continuously operated as an active filter. Accordingly, because the uninterruptible-power-supply module can be replaced while the active filter operation is kept, the uninterruptible-power-supply module can be replaced while not only continuously supplying power supply to the load but also preventing reduction of energy efficiency of the supplied AC power.

In the aforementioned uninterruptible power supply in which the housing-accommodating part is provided, it is preferable that the bus part includes an AC input bus part that is configured to be supplied with AC power from the AC power supply, and an AC output bus part that is configured to supply AC power from the power converter of the uninterruptible-power-supply module; the AC input bus part and the AC output bus part are arranged behind a back surface side of the uninterruptible-power-supply module in the housing-accommodating part; and the module interrupter is configured to electrically entirely disconnect the uninterruptible-power-supply module from the AC input bus part and the AC output bus part. According to this configuration, because the AC input bus part and the AC output bus part are arranged behind a back surface side of the uninterruptible-power-supply module, the uninterruptible-power-supply module whose back surface side is electrically disconnected can be easily accessed from its front surface side to be subjected to maintenance/inspection.

In this configuration, it is preferable that the bypass circuit part is arranged in the housing-accommodating part; and the AC input bus part and the AC output bus part are arranged behind the back surface side of the uninterruptible-power-supply module in an upper part of the housing-accommodating part; and the switching circuit of the bypass circuit part is arranged behind the back surface side of the uninterruptible-power-supply module in a lower part of the housing-accommodating part. According to this configuration, because the AC input bus part and the AC output bus part are separately arranged from the bypass circuit part in upper and lower parts of the housing-accommodating part, it is possible to prevent increase of a length in a depth direction of the housing-accommodating part from the front-surface side to the back-surface side.

In the aforementioned uninterruptible power supply in which the AC input bus part and the AC output bus part are arranged behind a back surface side of the uninterruptiblepower-supply module, it is preferable that the uninterruptible-power-supply module includes a module-side connection part that is electrically connected to the AC input bus part and the AC output bus part on one side in a leftward/rightward direction of the power conversion housing; the module-side connection part is electrically connected to the AC input bus part and the AC output bus part through a connecting-conductor part that extends from a front surface side toward the back surface side of the uninterruptible-power-supply module; and the module interrupter is configured to electrically disconnect the AC input bus part and the AC output bus part from the connecting-conductor part whereby electrically entirely disconnecting the uninterruptible-power-supply module from the AC input bus part and the AC output bus part. According to this configuration, because the module-side connection part is arranged on one side in a leftward/rightward direction of the power conversion housing, the module-side connection part can be easily accessed from the front-surface side of the uninterruptible-power-supply module as comparison with a case in which the module-side connection part is arranged on the back surface side. Accordingly, the uninterruptible-power-supply module can be electrically disconnected by the module interrupter, and mechanical connection of the uninterruptible-power-supply module to the housing-accommodating part can be easily released in the module-side connection part. Consequently, it is possible to further reduce a burden of replacement of the uninterruptible-power-supply module.

In the aforementioned uninterruptible power supply in which the AC input bus part and the AC output bus part are arranged behind a back surface side of the uninterruptible-power-supply module, it is preferable that the uninterruptible-power-supply module includes a module-side AC input part that is electrically connected to the AC input bus part, which is arranged in the housing-accommodating part, and a module-side AC output part that is electrically connected to the AC output bus part, which is arranged in the housing-accommodating part; and the module-side AC input part and the module-side AC output part extend in a leftward/rightward direction in the power conversion housing. According to this configuration, the AC input bus part and the AC output bus part can be electrically connected to the uninterruptible-power-supply module configured to deliver input/output power in the leftward/rightward direction. Consequently, also in a case in which the uninterruptible-power-supply module is configured to deliver input/output power in the leftward/rightward direction, the uninterruptible-power-supply module can be replaced while power is supplied to the load.

In the aforementioned uninterruptible power supply in which the housing-accommodating part is provided, it is preferable that the power converter of the uninterruptible-power-supply module is configured to convert DC power supplied from a battery outside the uninterruptible power supply into AC power and to supply the converted AC power to the load outside the uninterruptible power supply; the bus part includes a DC input bus part that is supplied with the DC power from the battery; the module interrupter is configured to electrically entirely disconnect the uninterruptible-power-supply module from the DC input bus part; and the module interrupter is configured to electrically entirely disconnect the uninterruptible-power-supply module from the DC input bus part. According to this configuration, because the DC input bus part, which provides the DC power from the battery to the power converter, is arranged behind a back surface side of the uninterruptible-power-supply module, the uninterruptible-power-supply module can be easily accessed from its front surface side to be subjected to maintenance/inspection.

In the aforementioned uninterruptible power supply in which the housing-accommodating part is provided, it is preferable that the housing-accommodating part includes a controller that is configured to control power conversion of the power converter of the uninterruptible-power-supply module; and the controller is arranged behind a back surface side of the uninterruptible-power-supply module in the housing-accommodating part. According to this configuration, because the controller configured to control power conversion is arranged in the housing-accommodating part, operations of the uninterruptible-power-supply module can be controlled by the controller outside the uninterruptible-power-supply module. Consequently, the uninterruptible-power-supply module can be replaced while power is supplied to the load under control by the controller.

In the aforementioned uninterruptible power supply in which the housing-accommodating part is provided, it is preferable that the housing-accommodating part includes a cooling fan that is configured to cool the switching circuit of the bypass circuit part; and the housing-accommodating part includes a cooling fan that is configured to cool the switching circuit of the bypass circuit part. According to this configuration, because the switching circuit accommodated in the housing-accommodating part can be cooled by the cooling fan, it is possible to prevent a temperature of the switching circuit from increasing too high. Because faults of the switching circuit caused by such temperature increase can be prevented, in a case in which the bypass circuit part is arranged in the housing-accommodating part configured to replaceably accommodate the uninterruptible-power-supply module, the bypass circuit part can stably switch electrical conduction.

In the aforementioned uninterruptible power supply in which the housing-accommodating part is provided, it is preferable that the uninterruptible-power-supply module is configured to be replaced by drawing out the uninterruptible-power-supply module to a front surface side from the housing-accommodating part, which accommodates the uninterruptible-power-supply module. According to this configuration, because the uninterruptible-power-supply module can be replaced by drawing out the uninterruptible-power-supply module, which is accommodated in the housing-accommodating part, to the front surface side, it is possible to reduce a burden of replacement of the uninterruptible-power-supply module.

In the uninterruptible power supply according to the aforementioned aspect, it is preferable that the uninterruptible-power-supply module includes a caster that is rotatable on a surface for placement of the power conversion housing, and is configured to movably support the power conversion housing. According to this configuration, when the uninterruptible-power-supply module is replaced, the caster rotates so that the uninterruptible-power-supply module can be easily moved. Consequently, it is possible to reduce a burden of replacement of the uninterruptible-power-supply module.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments embodying the present invention will be described with reference to the drawings.

First Embodiment

A configuration of an uninterruptible power supply (UPS) 100 according to a first embodiment of the present invention is described with reference to FIGS. 1 to 7. The uninterruptible power supply 100 is configured to be supplied with AC power from an AC power supply 101 in a 3-phase 4-wire system. In FIGS. 1 to 7, four conductors (phase U, phase V, phase W, and phase N corresponding to neutral line) in the 3-phase 4-wire system are illustrated by one line. Also, in FIGS. 1 to 7, two conductors corresponding to anode and cathode sides of DC power are similarly illustrated by one line.

(Configuration of the Uninterruptible Power Supply According to the First Embodiment)

Figure 1:
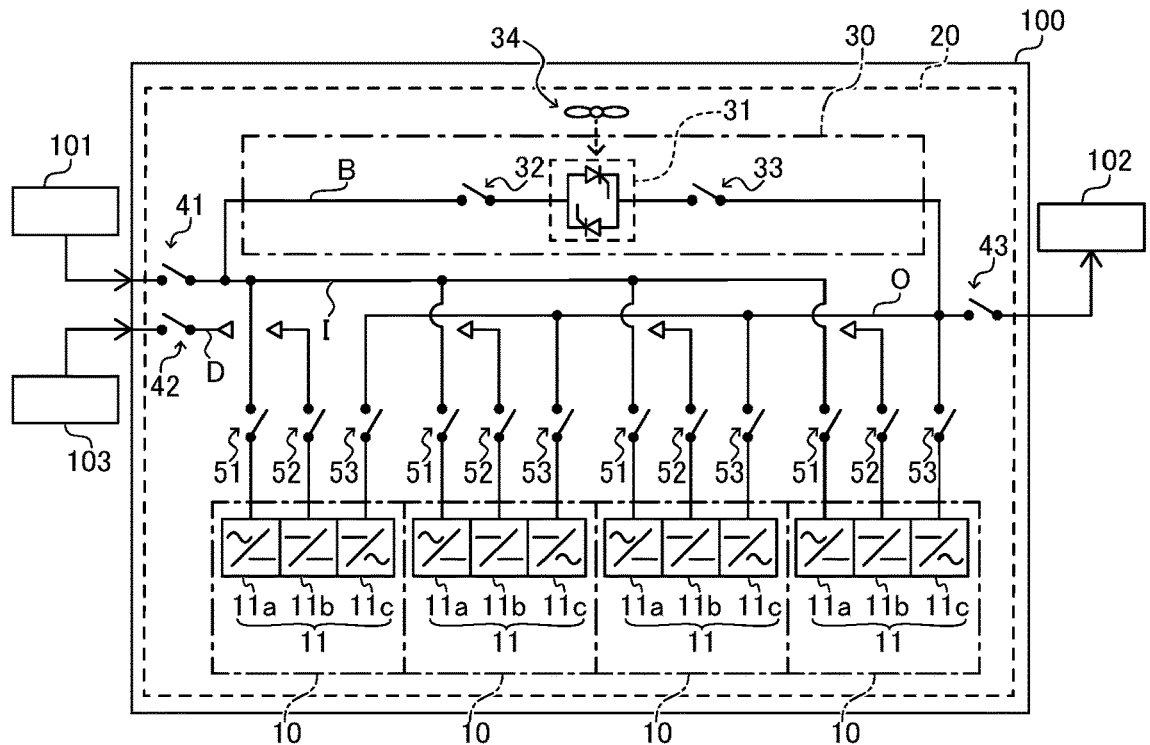
FIG. 1 is a circuit diagram showing an uninterruptible power supply according to a first embodiment of the present invention.
Figure 2:
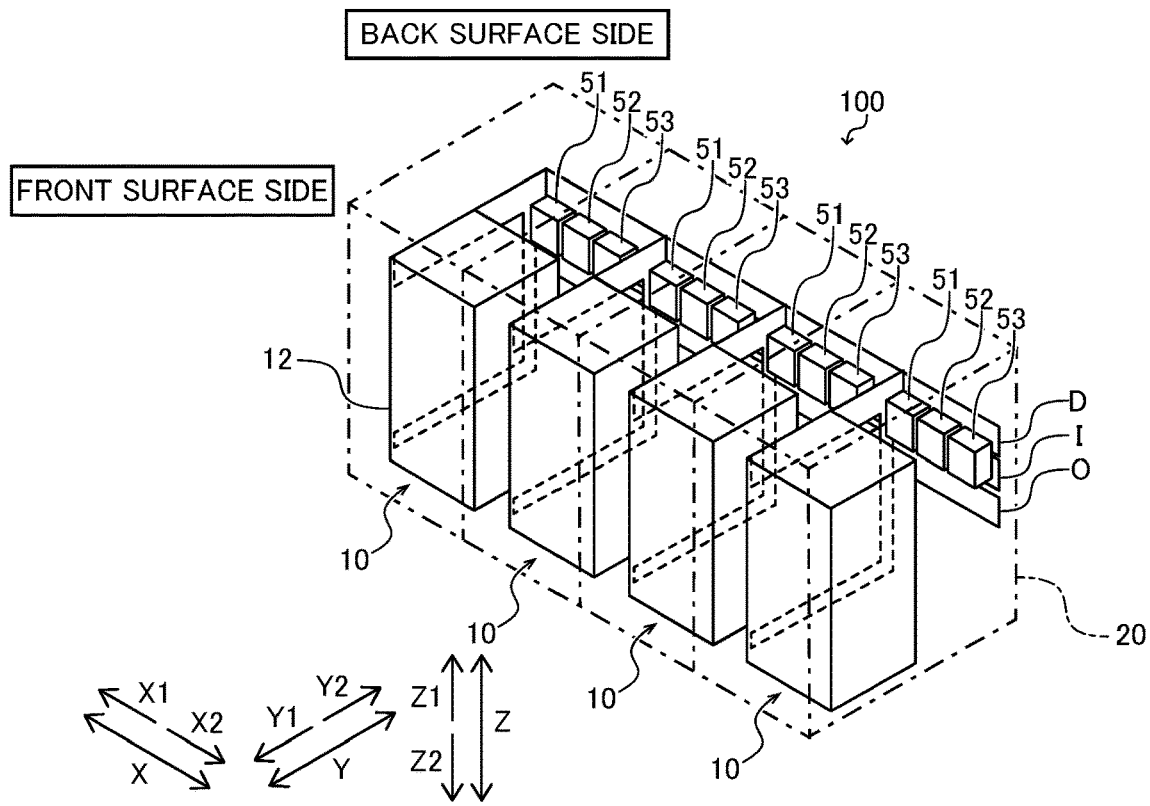
FIG. 2 is a perspective view showing the uninterruptible power supply according to the first embodiment of the present invention.

As shown in FIGS. 1 and 2, the uninterruptible power supply 100 is placed in a data center in which power is supplied to a load 102, such as a server and etc. Specifically, the uninterruptible power supply 100 is configured to supply AC power to the load 102 from the AC power supply 101 outside the uninterruptible power supply, and to convert DC power from a battery 103 outside the uninterruptible power supply into AC power and to supply the converted power to the load 102 in a case of failure of the AC power supply 101 (in power outage). The AC power supply 101 is an example of an "AC power supply" in the claims, and is an example of a "bypass AC power supply" in the claims too.

In the first embodiment, the uninterruptible power supply 100 includes a plurality of uninterruptible power modules (four uninterruptible power modules) 10 and a housing-accommodating part 20. The plurality of uninterruptible-power-supply modules 10 is arranged adjacent to each other in a leftward/rightward direction (X direction) in the housing-accommodating part 20. In the first embodiment, the plurality of uninterruptible power modules 10 has a common (similar) structure to each other. Although the following description describes a configuration of one of the plurality of uninterruptible power modules 10, the same components of the other uninterruptible power modules 10 as the one uninterruptible power module 10 are denoted by the same reference numerals, and their description is omitted.

As shown in FIG. 1, the uninterruptible-power-supply module 10 includes a power converter 11 in the first embodiment. The power converter 11 is configured to convert AC power supplied from the AC power supply 101 outside the uninterruptible power supply and to supply the converted AC power to the load 102 outside the uninterruptible power supply. Also, the power converter 11 is configured to convert DC power supplied from the battery 103 outside the uninterruptible power supply into AC power and to supply the converted AC power to the load 102 outside the uninterruptible power supply;

Specifically, the power converter 11 includes a rectifier circuit 11*a*, a chopper circuit 11*b*, and an inverter circuit 11*c*. The rectifier circuit 11*a* is configured to convert AC power provided to the power converter 11 into DC power. For example, the chopper circuit 11*b* is constructed of a 3-level chopper circuit. The chopper circuit 11*b* is configured to transform a voltage of DC power provided from the battery 103 to a different voltage, and to provide the transformed voltage of DC power. The DC power supplied from the battery 103 is provided through a conductor, a capacitor and a DC reactor (not shown) to the chopper circuit 11*b*. The inverter circuit 11*c* is configured to convert DC power provided from the rectifier circuit 11*a* and the chopper circuit 11*b* into AC power.

Figure 3:
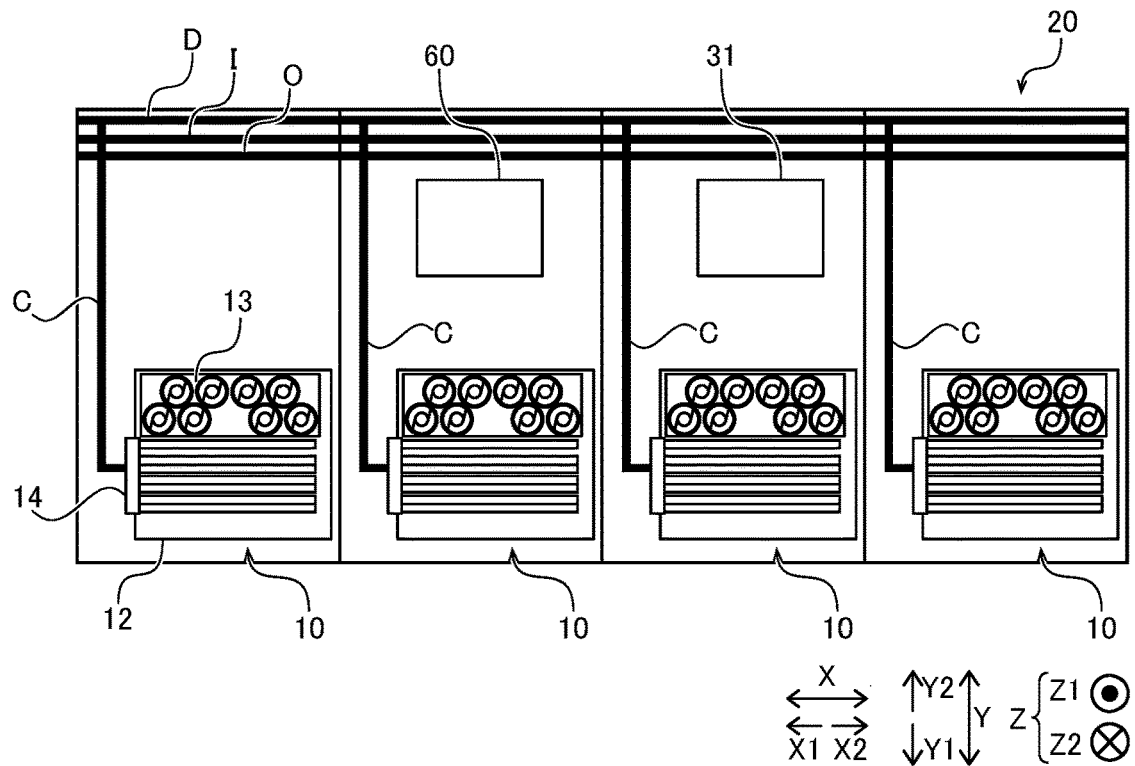
FIG. 3 is a diagram schematically showing an arrangement of the uninterruptible power supply as viewed from a top surface side.
Figure 4:
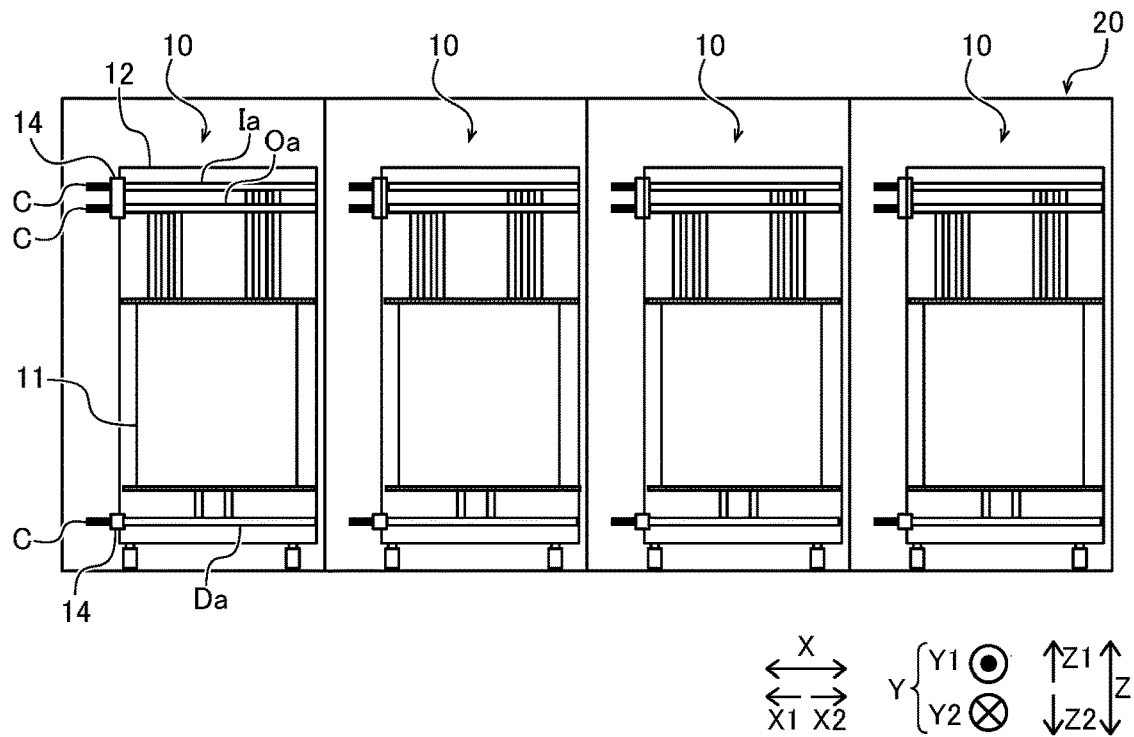
FIG. 4 is a diagram schematically showing the arrangement of the uninterruptible power supply as viewed from a front surface side.

As shown in FIGS. 2 to 4, each uninterruptible-power-supply module 10 includes a housing 12. The housing 12 accommodates the power converter 11. The housing 12 has a roughly rectangular parallelepiped shape. The housing 12 has a door that can be opened and closed on a front surface side (Y1 direction side) so that the power converter 11 accommodated in the housing can be accessed when the door is opened. A plurality of fans 13 is arranged on a back surface side (Y2 direction side) in the housing 12. The fans 13 are configured to blow air in a Z1 direction whereby cooling the power converter 11. Also, an opening is formed on a top surface side (Z1-direction-side surface) of the housing 12. Exhaust air is exhausted by the fans 13 through the opening of a top surface of the housing 12 to the outside of the housing 12. Also, an opening is correspondingly formed on a top surface side (Z1-direction-side surface) of the housing-accommodating part 20 to exhaust the exhaust air from the fans 13. The housing 12 is an example of a "power conversion housing" in the claims.

<Connection Between Uninterruptible-Power-Supply Module and Housing-Accommodating Part>

As shown in FIGS. 1 and 2, the housing-accommodating part 20 has a roughly rectangular parallelepiped shape. In the first embodiment, the housing-accommodating part 20 is configured to accommodate the plurality of uninterruptible-power-supply modules 10, and includes a plurality of bus parts configured to deliver input/output power to/from the plurality of uninterruptible-power-supply modules 10. The plurality of bus parts includes a bus I, a bus O, and a bus D. The bus I is an example of an "AC input bus part" in the claims. The bus O is an example of an "AC output bus part" in the claims. The bus D is an example of a "DC input bus part" in the claims.

AC power from the AC power supply 101 is provided to the bus I. The bus I is electrically connected to the AC power supply 101. In the uninterruptible power supply 100, the supplied AC power is provided to the plurality of uninterruptible-power-supply modules 10 through the bus I. The AC power supply 101, for example, is electrically connected to the bus I through a connector (not shown) arranged on the top surface (Z1-directional-side surface) of the housing-accommodating part 20.

AC power from the power converter 11 of the uninterruptible-power-supply module 10 is provided through the bus O. The bus O is electrically connected to the load 102. Specifically, power provided from the plurality of uninterruptible-power-supply modules 10 is supplied to the load 102 through the bus O included in the housing-accommodating part 20 in the uninterruptible power supply 100. The load 102, for example, is electrically connected to the bus O through a connector (not shown) arranged on the top surface (Z1-directional-side surface) of the housing-accommodating part 20.

DC power from the battery 103 is provided to the bus D. The bus D is electrically connected to the battery 103. In the uninterruptible power supply 100, the DC power supplied from the battery 103 is provided to the plurality of uninterruptible-power-supply modules 10 through the bus D. Similar to the AC power supply 101, the battery 103 is electrically connected to the bus D through a connector (not shown) arranged on the top surface (Z1-directional-side surface) of the housing-accommodating part 20, for example.

Figure 5:
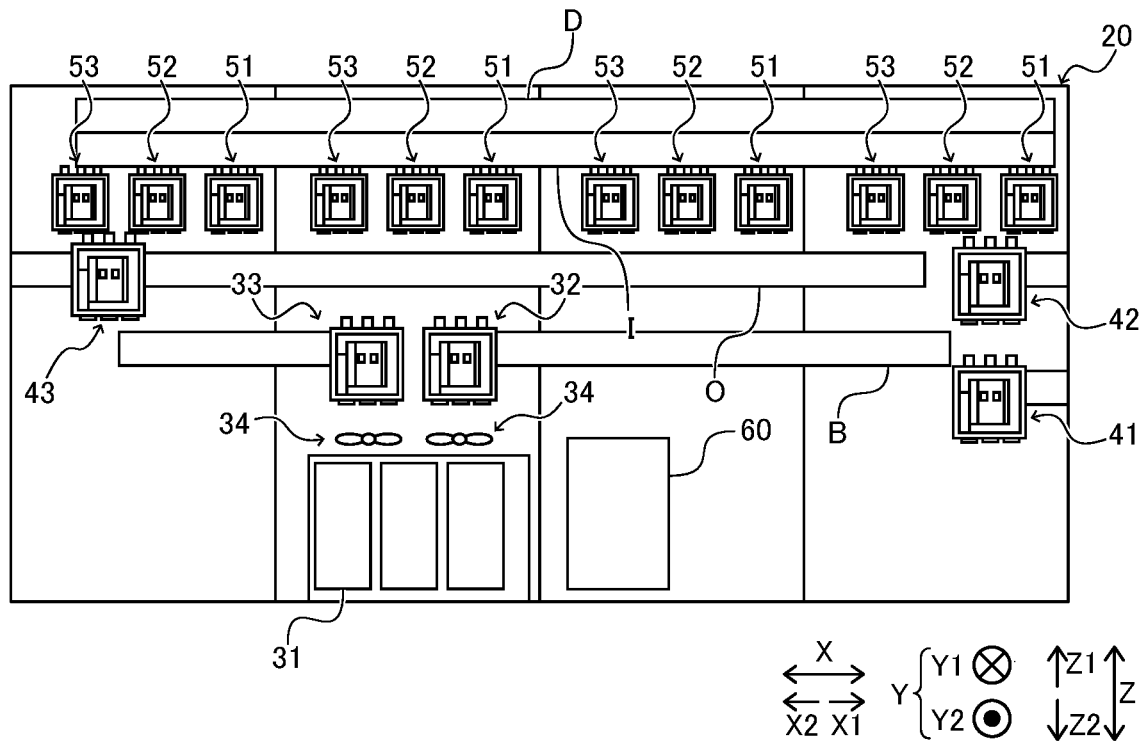
FIG. 5 is a diagram schematically showing the arrangement of the uninterruptible power supply according to the first embodiment of the present invention as viewed from a back surface side.

As shown in FIGS. 3 and 5, the plurality of bus parts (bus I, bus O and bus D) is arranged in the housing-accommodating parts 20 outside the housings 12 of the uninterruptible-power-supply modules 10. Specifically, the bus I, the bus O and the bus D are arranged on an upper side (top surface side, i.e., Z1 direction side) behind the back surface sides (Y2 direction sides) of the uninterruptible-power-supply modules 10. For example, the bus I, the bus O and the bus D are formed of a bus-bar, which is a plate-shaped conductor. The bus I, the bus O and the bus D extend in the back surface side (Y2 direction side) of the housing-accommodating part 20 in the leftward/rightward direction (X-direction). Each of the bus I and the bus O includes the four conductors configured to supply AC power in the 3-phase 4-wire system. The bus D includes two conductors configured to supply DC power.

As shown in FIGS. 1 and 5, the housing-accommodating part 20 includes an interrupter 41, an interrupter 42 and an interrupter 43. The interrupter 41 is provided on an input side (AC power supply 101 side) of the bus I. The interrupter 42 is provided on an input side (battery 103 side) of the bus D. The interrupter 43 is provided on an output side (load 102 side) of the bus O. The interrupters 41 to 43 are a molded case circuit breaker (MCCB), for example. The interrupters 41 to 43 are configured to interrupt electrical conduction if an overcurrent is detected, for example. The interrupters 41 to 43 are arranged behind the back surface side (Y2 direction side) of the uninterruptible-power-supply module 10 in the housing-accommodating part 20.

As shown in FIGS. 3 and 4, each uninterruptible-power-supply module 10 includes a connection part 14 in the first embodiment. The connection part 14 is arranged on one side (X1 direction side) in the leftward/rightward direction of the housing 12, and is electrically connected to the bus I, the bus O and the bus D. The connection part 14 is electrically connected to the bus I, the bus O and the bus D through conductors C that extend from the front surface side (Y1 direction side) toward the back surface side (Y2 direction side) of the uninterruptible-power-supply module 10. The connection part 14 is an example of a "module-side connection part" in the claims. The conductor C is an example of a "connecting-conductor part" in the claims.

The conductors C are connected to the conductors of the bus I, the bus O and the bus D corresponding to the phases. The conductors C extend from the front surface side (Y1 direction side) toward the back surface side (Y2 direction side) of the uninterruptible-power-supply module 10 on the X1 direction side of the housing 12 of each of the plurality of uninterruptible-power-supply modules 10. The connection part 14 is configured to connect the conductors C to the conductors of the bus I, the bus O and the bus D corresponding to the phases. In other words, the conductor C includes ten conductors corresponding to the bus I and the bus O provided with AC power in the 3-phase 4-wire system, and the bus D provided with DC power. For example, the conductor C is formed of a bus-bar, which is a plate-shaped conductor.

As shown in FIG. 4, each uninterruptible-power-supply module 10 includes a bus Ia, a bus Oa and a bus Da. The bus Ia is electrically connected to the bus I, which is provided in the housing-accommodating part 20. Specifically, the bus Ia is electrically connected to the conductors C through connection part 14 so that the bus Ia is electrically connected to the bus I. The bus Ia is connected to an input side of the rectifier circuit 11a of the power converter 11. In other words, the bus Ia is configured to provide AC power supplied from the AC power source 101 to the power converter 11. The bus Ia includes four conductors corresponding to the bus I provided with AC power in the 3-phase 4-wire system. The bus Ia is an example of a "module-side AC input part" in the claims.

The bus Oa is electrically connected to the bus O, which is provided in the housing-accommodating part 20. Specifically, the bus Oa is electrically connected to the conductors C through connection part 14 so that the bus Oa is electrically connected to the bus O. The bus Oa is connected to an output side of the inverter circuit 11c of the power converter 11. In other words, AC power converted by the power converter 11 is provided through the bus Oa. The bus Oa includes four conductors corresponding to the bus O provided with AC power in the 3-phase 4-wire system. The bus Oa is an example of a "module-side AC output part" in the claims.

The bus Da is electrically connected to the bus D, which is provided in the housing-accommodating part 20. Specifically, the bus Da is electrically connected to the conductors C through the connection part 14 so that the bus Da is electrically connected to the bus D. The bus Da is connected to an input side of the chopper circuit 11b of the power converter 11. In other words, the bus Da is configured to provide DC power supplied from the battery 103 to the power converter 11. The bus Da includes two conductors corresponding to the bus D provided with DC power.

The bus Ia, the bus Oa and the bus Da extend in the housing 12 in the leftward/rightward direction (X-direction). For example, each of the bus Ia, the bus Oa and the bus Da is formed of a bus-bar, which is a plate-shaped conductor. Specifically, the bus Ia, the bus Oa and the bus Da extend from a side surface on the X1 direction side to a side surface on the X2 direction side of the housing 12. The bus Ia, the bus Oa and the bus Da are connected to the conductors C on the side surface on the X1 direction side of the housing 12 through the connection part 14. The bus Ia and the bus Oa are arranged in the top surface side (Z1 direction side) of the housing 12. The bus Da is arranged in a bottom side (Z2 direction side) of the housing 12. Correspondingly, the conductor C that connects the bus Da and the bus D has an L shape that extends in the X direction and turns to extend in the Z direction so that the conductor C is connected to the bus D arranged in the upper part of the back surface side of the housing-accommodating part 20.

<Bypass Circuit Part>

As shown in FIG. 1, the housing-accommodating part 20 includes a bypass circuit part 30 in the first embodiment. The bypass circuit part 30 is configured to supply AC power from the AC power supply 101 to the load 102 without connection through the uninterruptible-power-supply modules 10. The bypass circuit part 30 is arranged in the housing-accommodating part 20.

The bypass circuit part 30 includes a switching circuit 31 switching electrical conduction. The switching circuit 31 includes thyristor units each of which is constructed of a pair of thyristors that is connected in parallel to each other with their polarities being opposite. Each of the thyristor units corresponds to one of the phases of AC power supplied from the AC power supply 101 to the bypass circuit part 30 in one-to-one correspondence between the thyristor units and the phases.

The switching circuit 31 is configured to switch between ON and OFF in accordance with a control signal from a controller 60 (see FIG. 3), which will be described later. In the first embodiment, the switching circuit 31 is an uninterruptible switching circuit configured to switch between supplying AC power from the uninterruptible-power-supply modules 10 to the load 102 and supply AC power from the AC power supply 101 to the load 102 without connection through the uninterruptible-power-supply modules 10 while preventing instantaneous interruption of power supplied to the load 102.

As shown in FIGS. 3 and 5, the switching circuit 31 (thyristor units) is arranged in a lower part (Z2 direction side) of the back surface side (Y2 direction side) of the housing-accommodating part 20. In other words, the buses I, O and D, and the switching circuit 31 are separately arranged from each other in an upward/downward direction in the back surface side of the housing-accommodating part 20.

As shown in FIGS. 1 and 5, the bypass circuit part 30 includes the bus B. The bus B is arranged in the back surface side of the housing-accommodating part 20. The bus B is configured to electrically connect the AC power supply 101 to the load 102 through the switching circuit 31. Specifically, bus B is configured to electrically connect the bus I to the switching circuit 31, and to electrically connect the switching circuit 31 to the bus O. When the switching circuit 31 is switched ON, AC power from the AC power supply 101 is directly supplied to the load 102 from the bus O through the bus B. For example, the bus B is formed of a bus-bar, which is a plate-shaped conductor. The bus B includes four conductors that are provided on each of input and output sides of the switching circuit 31 and is configured to supply AC power in the 3-phase 4-wire system similar to the bus I and the bus O.

The bypass circuit part 30 includes an interrupter 32 and an interrupter 33. In the first embodiment, the interrupter 32 and the interrupter 33 are configured to electrically disconnect the switching circuit 31 from the bypass circuit part 30. The interrupter 32 is configured to interrupt AC power supplied from the AC power supply 101 to the switching circuit 31. Specifically, the interrupter 32 is connected between the bus B on a bus I side and the switching circuit 31. The interrupter 33 is configured to interrupt AC power supplied from the switching circuit 31 to the load 102 side. Specifically, the interrupter 33 is connected between the bus B on a bus O side and the switching circuit 31. The interrupters 32 and 33 are molded case circuit breakers (MCCB), for example.

In the first embodiment, the housing-accommodating part 20 includes cooling fans 34. The cooling fans 34 are configured to cool the switching circuit 31 of the bypass circuit part 30. Specifically, the cooling fans 34 are configured to blow air toward the top surface side (Z1 direction side) whereby exhausting heat from the switching circuit 31 to the outside of the housing-accommodating part 20. The housing-accommodating part 20 has an opening in the top surface (Z1-direction-side surface) for exhausting waste heat from the cooling fans 34 to the outside.

<Controller>

As shown in FIGS. 3 and 5, the housing-accommodating part 20 includes the controller 60. The controller 60 is configured to control the uninterruptible power supply 100. Specifically, the controller 60 is configured to control power conversion of the power converters 11 of the uninterruptible-power-supply modules 10. Also, the controller 60 is configured to control ON/OFF switching of the switching circuit 31 of the bypass circuit part 30. Also, the controller 60 is configured to control opening/closing of the interrupters 32 and 33. In addition, the controller 60 is configured to control the uninterruptible power supply depending on apparatuses connected to the uninterruptible power supply 100 such as the AC power supply 101, the load 102 and the battery 103.

The controller 60 includes a plurality of control boards. The control boards include circuit boards on which a CPU (Central Processing Unit), a ROM (Read Only Memory) or RAM (Random Access Memory), etc. are mounted. The controller 60 is arranged in the lower part (bottom side, i.e., Z2 direction side) of the housing-accommodating part 20 behind the back surface side (Y2 direction side) of the uninterruptible-power-supply module 10.

The uninterruptible power supply 100 is configured to selectively operate between two operation modes of an inverter power supply mode and a commercial power supply mode. The controller 60 can select one of the two operation modes in accordance with an input instruction provided to an operation unit (not shown), and can operate in the selected mode.

The uninterruptible power supply 100 converts AC power from the AC power supply 101 outside of the uninterruptible power supply by using the power converters 11, and supply the converted power to the load 102 in the inverter power supply mode. Specifically, in the inverter power supply mode, AC power supplied from the AC power supply 101 is provided to the plurality of uninterruptible-power-supply modules 10 through the bus I. The AC power converted by the power converters 11 of the plurality of uninterruptible-power-supply modules 10 is then supplied to the load 102 through the bus O. At this time, if a failure such as a power failure occurs in the AC power supply 101, DC power from the battery 103 is converted into AC power by the power converters 11 and supplied to the load 102 through the bus O.

Also, the uninterruptible power supply 100 directly supplies AC power from the AC power supply 101 to the load 102 without converting the AC power in the commercial power supply mode. Specifically, AC power from the AC power supply 101 outside the uninterruptible power supply is directly supplied to the load 102 through the bypass circuit part 30. At this time, if a failure such as a power failure occurs in the AC power supply 101, the switching circuit 31 interrupts electrical conduction of the bypass circuit part 30 and the power converters 11 are activated so that DC power from the battery 103 is converted into AC power by the power converters 11 and supplied to the load 102 through the bus O.

Also, in the uninterruptible power supply 100, the power converter 11 operates as an active filter in the commercial power supply mode. Specifically, in the commercial power supply mode, the power converter 11 is configured to operate as an active filter serving to reduce a reactive current and a harmonic current generated by the load 102 while supplying AC power from the AC power supply 101 through the bypass circuit part 30 to the load 102. In the operation as the active filter, the harmonic current is canceled out by controlling output from the power converters 11 so that a power factor can be improved, and power efficiency of the uninterruptible power supply 100 can be improved.

(Disconnection of Uninterruptible Power Supply)

In the first embodiment, the uninterruptible-power-supply modules 10 can be replaceably accommodated in the housing-accommodating part 20. For example, if a fault occurs in one of the plurality of uninterruptible power modules 10, the one uninterruptible power module 10 is electrically disconnected from the housing-accommodating part 20 and is then replaced.

Specifically, as shown in FIGS. 1, 2, and 5, the housing-accommodating part 20 includes interrupters 51, interrupters 52 and interrupters 53. Four sets of the interrupters 51 to 53 are provided corresponding to the four uninterruptible-power-supply modules 10. The interrupters 51 to 53 are molded case circuit breakers (MCCB), for example. The interrupters 51 to 53 are examples of a "module interrupter" in the claims.

In the first embodiment, each set of the interrupters 51 to 53 is provided between one of the uninterruptible-power-supply modules 10 and the bus part (bus I, bus O, and bus D), and is configured to electrically entirely disconnect the one uninterruptible-power-supply module 10 from the bus part. Specifically, each set of the interrupters 51 to 53 is configured to electrically disconnect the bus I, the bus O and the bus D from the conductors C whereby electrically entirely disconnecting one of the uninterruptible-power-supply modules 10 from the bus I, the bus O and the bus D.

More specifically, the interrupter 51 is configured to electrically disconnect an AC power input side (rectifier circuit 11a) of the power converter 11 from the bus I based on a control signal from the controller 60. In other words, the interrupter 51 electrically disconnects the bus I from the conductor C in the housing-accommodating part 20. When the interrupter 51 interrupts electrical conduction, the uninterruptible-power-supply module 10 is electrically disconnected from the AC power supply 101. The interrupter 51 is arranged in the back surface side (Y2 direction side) of the housing-accommodating part 20.

Also, the interrupter 52 is configured to electrically disconnect a DC power input side (chopper circuit 11b) of the power converter 11 from the bus D based on a control signal from the controller 60. In other words, the interrupter 52 electrically disconnects the bus D from the conductor C in the housing-accommodating part 20. When the interrupter 52 interrupts electrical conduction, the uninterruptible-power-supply module 10 is electrically disconnected from the battery 103. The interrupter 52 is arranged in the back surface side (Y2 direction side) of the housing-accommodating part 20 similar to the interrupter 51.

Also, the interrupter 53 is configured to electrically disconnect an output side (inverter circuit 11c) of the power converter 11 from the bus O based on a control signal from the controller 60. In other words, the interrupter 53 electrically disconnects the bus O from the conductor C in the housing-accommodating part 20. When the interrupter 53 interrupts electrical conduction, the uninterruptible-power-supply module 10 is electrically disconnected from the load 102. The interrupter 53 is arranged in the back surface side (Y2 direction side) of the housing-accommodating part 20 similar to the interrupter 51 and the interrupter 52.

Figure 6:
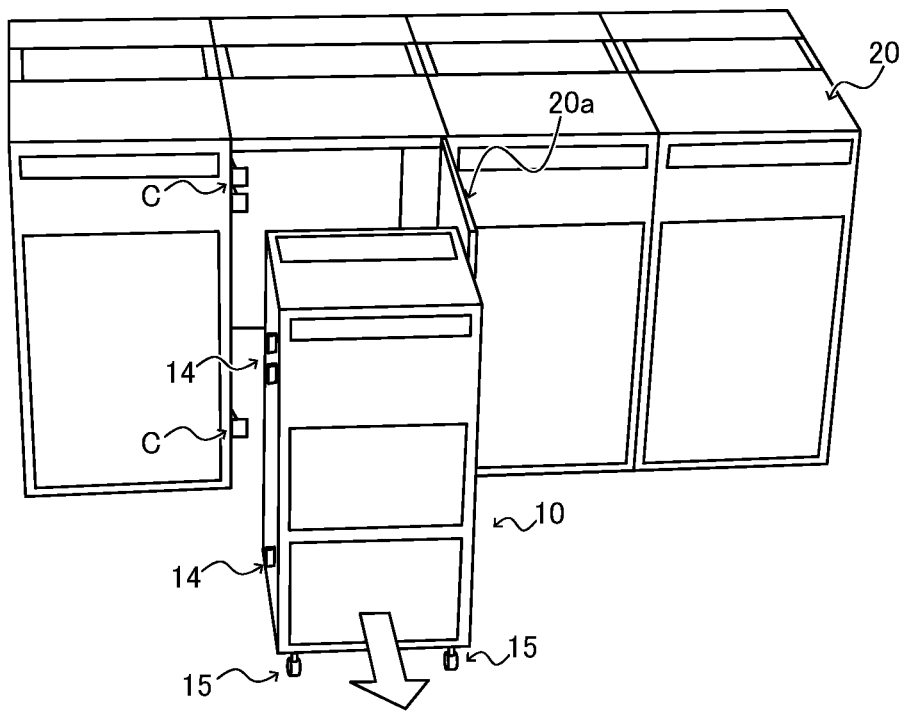
FIG. 6 is a diagram illustrating replacement of an uninterruptible-power-supply module.

As shown in FIG. 6, the uninterruptible-power-supply module 10 is movable (can be drawn out) in the first embodiment. Specifically, the uninterruptible-power-supply module 10 is configured to be replaced by drawing out the uninterruptible-power-supply module to the front surface side from the housing-accommodating part 20, which accommodates the uninterruptible-power-supply module. The uninterruptible-power-supply module 10 includes casters 15. The casters 15 can rotate on a surface for placement of the housing 12 (a floor surface on which the housing 12 is placed), and is configured to movably support the housing 12. For example, each of four corners of a bottom surface (Z2-direction-side surface) of the housing 12 is provided with one of the casters 15.

When maintenance/inspection including replacement of the uninterruptible-power-supply module 10 is performed, the interrupters 51 to 53 first electrically disconnect the uninterruptible-power-supply module 10 from the bus part (bus I, bus O and bus D). In order to replace the uninterruptible-power-supply module 10, after the uninterruptible-power-supply module 10 is electrically disconnected (no voltage is applied), mechanical connection between the uninterruptible-power-supply module and the conductors C in the connection parts 14 is released. In other words, the connection parts 14 are physically separated from the conductors C. The connection parts 14 can be fastened to the conductors C by fasteners, such as bolts, for example. Subsequently, the uninterruptible power module 10 is replaced by entirely drawing out the housing 12 to the front surface side (Y1 direction side).

For example, a door 20a is arranged in the front surface side (Y1 direction side) of the housing-accommodating part 20. The door 20a is configured to be opened/closed by a worker who replaces the uninterruptible-power-supply module 10 in order to replace the uninterruptible-power-supply module. The housing-accommodating part 20 includes partitioning walls for separately accommodating the plurality of uninterruptible-power-supply modules 10. Guide rails configured to guide movement of the casters 15 may be installed on the placement surface (floor surface) inside the housing-accommodating part 20.

In a case in which one of the plurality of uninterruptible-power-supply modules 10 is electrically disconnected from the bus part (the bus I, the bus O and the bus D) in order to perform maintenance/inspection including replacement, the controller 60 brings the uninterruptible power supply 100 into the commercial power supply mode. In other words, the uninterruptible power supply 100 is configured to electrically disconnect the uninterruptible-power-supply module 10 by using the interrupters 51 to 53 while directly supplying AC power from the AC power supply 101 to the load 102 through the bypass circuit part 30.

(Replacement of Switching Circuit)

The switching circuit 31 of the bypass circuit part 30 can be replaced similar to the uninterruptible-power-supply module 10. Specifically, in the first embodiment, the switching circuit 31 is configured to be replaceable when being electrically disconnected from the bypass circuit part 30 (bus B) by the interrupters 32 and 33.

Figure 7:
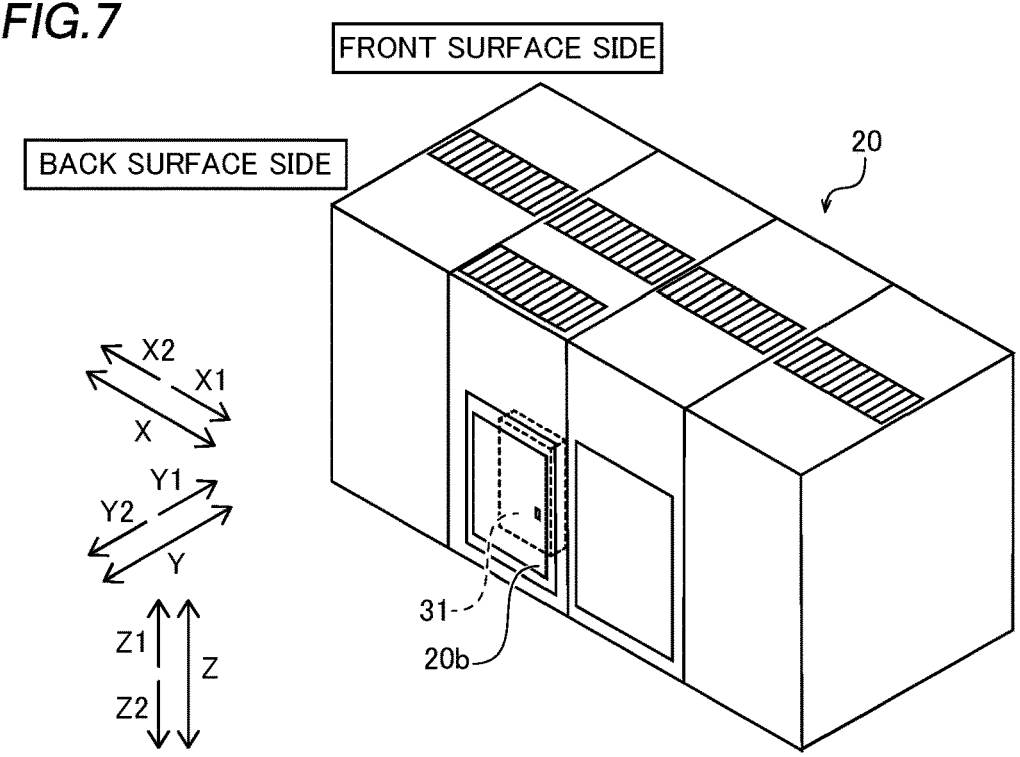
FIG. 7 is a perspective view illustrating replacement of a switching circuit of a bypass circuit part.

More specifically, as shown in FIG. 7, a door 20b configured to allow a worker to access the switching circuit 31 is provided in the back surface side (Y2 direction side) of the housing-accommodating part 20. The worker can open the door 20b to perform maintenance/inspection (replacement) of the switching circuit 31. When the switching circuit 31 is electrically disconnected by the interrupters 32 and 33, the uninterruptible power supply 100 operates in the inverter power supply mode.

Advantages of First Embodiment

In the first embodiment, the following advantages are obtained.

In the first embodiment, the uninterruptible power supply 100 includes the interrupters 51 to 53 (module interrupters) that are provided between the uninterruptible-power-supply module 10 and the bus part (bus I, bus O and bus D), and are configured to electrically entirely disconnect the uninterruptible-power-supply module 10 from the bus part. In addition, the uninterruptible power supply 100 includes a bypass circuit part 30 that includes a switching circuit 31 switching electrical conduction, and is configured to supply AC power from an AC power supply 101 (bypass AC power supply) to the load 102 without connection through the uninterruptible-power-supply modules 10. According to this configuration, because the uninterruptible-power-supply module 10 can be electrically entirely disconnected from the bus part by the interrupters 51 to 53 while power is supplied to the load 102 by the bypass circuit part 30, it is possible to entirely bring internal circuitry of the uninterruptible-power-supply module 10 in zero voltage without stopping supplying the power to the load 102. Consequently, the uninterruptible-power-supply module 10 can be entirely replaced while power is supplied to the load 102.

In the first embodiment, as discussed above, the uninterruptible power supply 100 further includes a housing-accommodating part 20 that is configured to replaceably accommodate the uninterruptible-power-supply modules 10, and includes the bus part (bus I, bus O and bus D) and the interrupters 51 to 53 (module interrupters). Accordingly, because the bus part and the interrupters 51 to 53 (module interrupters) are included in the housing-accommodating part 20 configured to replaceably accommodate the uninterruptible-power-supply modules 10, the uninterruptible-power-supply module 10 can be easily replaced with the bus part in a state that the uninterruptible-power-supply module and the load 102 are connected to each other outside the uninterruptible-power-supply module 10. As a result, in a case in which the uninterruptible-power-supply module 10 is replaced, the load 102 can be reliably continuously supplied with power outside the uninterruptible-power-supply module 10.

In the first embodiment, as discussed above, the bypass circuit part 30 is arranged in the housing-accommodating part 20. In addition, the switching circuit 31 of the bypass circuit part 30 includes an uninterruptible switching circuit that is configured to switch between supplying AC power from the uninterruptible-power-supply modules 10 to the load 102 and supplying AC power from the AC power supply 101 (bypass AC power supply) to the load 102 without connection through the uninterruptible-power-supply modules 10 while preventing instantaneous interruption of power supplied to the load 102. Accordingly, because the bypass circuit part 30 includes the uninterruptible switching circuit, even if a fault occurs in the power converters 11 during power supply through the power converters 11 to the load 102, AC power from the AC power supply 101 can be supplied to the load 102 while preventing instantaneous interruption of power supplied to the load 102. Also, because the uninterruptible switching circuit of the bypass circuit part 30 is provided in the housing-accommodating part 20 outside the uninterruptible-power-supply modules 10, dissimilar to a case in which the bypass circuit part 30 is provided inside the uninterruptible-power-supply module 10, the uninterruptible-power-supply module 10 can be replaced while the load 102 is continuously supplied with power without additionally providing a bypass circuit for maintenance/inspection in the housing-accommodating part 20. Consequently, it is possible to prevent complication of a circuit configuration that allows replacement of the uninterruptible-power-supply module 10 while power is supplied to the load 102.

In the first embodiment, as discussed above, the housing-accommodating part 20 includes the interrupters 32 and 33 (switching circuit interrupter) configured to electrically disconnect the switching circuit 31 from the bypass circuit part 30; and the switching circuit 31 is configured to be replaceable when being electrically disconnected by the interrupters 32 and 33. Accordingly, in a case in which AC power from the power converters 11 of the uninterruptible-power-supply modules 10 is supplied to the load 102, the switching circuit 31 of the bypass circuit part 30 can be electrically disconnected in the housing-accommodating part 20 by the interrupters 32 and 33. Consequently, the switching circuit 31 can be replaced while AC power is continuously supplied through the power converter 11 to the load 102.

In the first embodiment, as discussed above, a plurality of uninterruptible-power-supply modules 10 (four uninterruptible-power-supply modules) is provided; the plurality of uninterruptible-power-supply modules 10 is arranged adjacent to each other in the leftward/rightward direction (X direction) in the housing-accommodating part 20; and a plurality of sets (four sets) of interrupters 51 to 53 (a plurality of module interrupters) is provided corresponding to the plurality of uninterruptible-power-supply modules 10. Accordingly, because a plurality of uninterruptible-power-supply modules 10 is provided, even if a fault occurs in one of the plurality of uninterruptible-power-supply modules 10, AC power can be supplied to the load 102 by converting AC power by using other uninterruptible-power-supply modules 10 in which no fault occurs. In some cases, the power converter 11 of the uninterruptible-power-supply module 10 may be operated as an active filter serving to reduce a reactive current and a harmonic current generated by the load 102 while supplying AC power from the AC power supply 101 (bypass AC power supply) through the bypass circuit part 30 to the load 102. Even in such a case, because the plurality of uninterruptible-power-supply modules 10 is provided, by electrically disconnecting only one of the plurality of uninterruptible-power-supply modules 10, the disconnected uninterruptible-power-supply module 10 can be replaced while other uninterruptible-power-supply modules 10, which are not disconnected, are continuously operated as an active filter. Accordingly, because the uninterruptible-power-supply module 10 can be replaced while the active filter operation is kept, the uninterruptible-power-supply module 10 can be replaced while not only continuously supplying power supply to the load 102 but also preventing reduction of energy efficiency of the supplied AC power.

In the first embodiment, as discussed above, the bus part includes the bus I (AC input bus) part that is configured to be supplied with AC power from the AC power supply 101, and the bus O (AC output bus part) that is configured to supply AC power from the power converters 11 of the uninterruptible-power-supply modules 10; the bus I and the bus O are arranged behind the back surface side (Y2 direction side) of the uninterruptible-power-supply modules 10 in the housing-accommodating part 20; and the interrupters 51 to 53 (module interrupters) are configured to electrically entirely disconnect the uninterruptible-power-supply module 10 from the bus I and the bus O. Accordingly, because the bus I and the bus O are arranged behind the back surface sides of the uninterruptible-power-supply modules 10, the uninterruptible-power-supply module 10 whose back surface side is electrically disconnected can be easily accessed from its front surface side (Y1 direction side) to be subjected to maintenance/inspection.

In the first embodiment, as discussed above, the bus I (AC input bus part) and the bus O (AC output bus part) are arranged behind the back surface side (Y2 direction side) of the uninterruptible-power-supply modules 10 in an upper part side (Z1 direction side) of the housing-accommodating part 20; and the switching circuit 31 of the bypass circuit part 30 is arranged behind the back surface side of the uninterruptible-power-supply modules 10 in a lower part side (Z2 direction side) of the housing-accommodating part 20. Accordingly, because the bus I and the bus O are separately arranged from the bypass circuit part 30 in upper and lower parts of the housing-accommodating part 20, it is possible to prevent increase of a length in a depth direction (Y direction) of the housing-accommodating part 20 from the front-surface side to the back-surface side.

In the first embodiment, as discussed above, the uninterruptible-power-supply module 10 includes the connection part 14 (module-side connection part) that is electrically connected to the bus I (AC input bus part) and the bus O (AC output bus part) on one side in the leftward/rightward direction of the housing 12 (power conversion housing); the connection part 14 is electrically connected to the bus I and the bus O through the conductors C (connecting-conductor part) that extend from the front surface side (Y1 direction side) toward the back surface side (Y2 direction side) of the uninterruptible-power-supply module 10; and each set of the interrupters 51 to 53 (module interrupter) is configured to electrically disconnect the bus I and the bus O from the conductors C whereby electrically disconnecting one of the uninterruptible-power-supply modules 10 from the bus I and the bus O. Accordingly, because the connection part 14 is arranged on one side in the leftward/rightward direction of the housing 12 (power conversion housing), the connection part 14 can be easily accessed from the front-surface side of the uninterruptible-power-supply module 10 as comparison with a case in which the module-side connection part 14 is arranged on the back surface side. Accordingly, the uninterruptible-power-supply module 10 can be electrically disconnected by the interrupters 51 to 53, and mechanical connection of the uninterruptible-power-supply module 10 to the housing-accommodating part 20 can be easily released in the module-side connection part 14. Consequently, it is possible to further reduce a burden of replacement of the uninterruptible-power-supply module 10.

In the first embodiment, as discussed above, the uninterruptible-power-supply module 10 includes the bus Ia (module-side AC input part) that is electrically connected to the bus I (AC input bus part), which is arranged in the housing-accommodating part 20, and the bus Oa (module-side AC output part) that is electrically connected to the bus O (AC output bus part), which is arranged in the housing-accommodating part 20; and the bus Ia and bus Oa extend in a leftward/rightward direction in the housing 12 (power conversion housing). Accordingly, the bus I and the bus O can be electrically connected to the uninterruptible-power-supply module 10 configured to deliver input/output power in the leftward/rightward direction. Consequently, also in a case in which the uninterruptible-power-supply module 10 is configured to deliver input/output power in the leftward/rightward direction, the uninterruptible-power-supply module 10 can be replaced while power is supplied to the load 102.

In the first embodiment, as discussed above, the power converter 11 of the uninterruptible-power-supply module 10 is configured to convert DC power supplied from the battery 103 outside the uninterruptible power supply into AC power and to supply the converted AC power to the load 102 outside the uninterruptible power supply; the bus part includes the bus D (DC input bus part) that is supplied with the DC power from the battery 103; the bus D is arranged behind the back surface side (Y2 direction side) of the uninterruptible-power-supply modules 10 in the housing-accommodating part 20; and the interrupters 51 to 53 (module interrupters) are configured to electrically entirely disconnect the uninterruptible-power-supply module 10 from the bus D. Accordingly, because the bus D, which provides the DC power from the battery 103 to the power converter 11, is arranged behind the back surface side of the uninterruptible-power-supply modules 10, the uninterruptible-power-supply module 10 can be easily accessed from its front surface side (Y1 direction side) to be subjected to maintenance/inspection.

In the first embodiment, as discussed above, the housing-accommodating part 20 includes the controller 60 that is configured to control power conversion of the power converters 11 of the uninterruptible-power-supply modules 10; and the controller 60 is arranged behind the back surface side (Y2 direction side) of the uninterruptible-power-supply modules 10 in the housing-accommodating part 20. Accordingly, because the controller 60 configured to control power conversion is arranged in the housing-accommodating part 20, operations of the uninterruptible-power-supply modules can be controlled by the controller 60 outside the uninterruptible-power-supply modules 10. Consequently, the uninterruptible-power-supply module 10 can be replaced while power is supplied to the load 102 under control by the controller 60.

In the first embodiment, as discussed above, the housing-accommodating part 20 includes cooling fans 34 that are configured to cool the switching circuit 31 of the bypass circuit part 30. Accordingly, because the switching circuit 31 accommodated in the housing-accommodating part 20 can be cooled by the cooling fans 34, it is possible to prevent a temperature of the switching circuit 31 from increasing too high. Because faults of the switching circuit 31 caused by such temperature increase can be prevented, in a case in which the bypass circuit part 30 is arranged in the housing-accommodating part 20 configured to replaceably accommodate the uninterruptible-power-supply modules 10, the bypass circuit part 30 can stably switch electrical conduction.

In the first embodiment, as discussed above, the uninterruptible-power-supply module 10 is configured to be replaced by drawing out the uninterruptible-power-supply module 10 to the front surface side (Y1 direction side) from the housing-accommodating part 20, which accommodates the uninterruptible-power-supply module. Accordingly, because the uninterruptible-power-supply module 10 can be replaced by drawing out the uninterruptible-power-supply module 10, which is accommodated in the housing-accommodating part 20, to the front surface side, it is possible to reduce a burden of replacement of the uninterruptible-power-supply module 10.

In the first embodiment, as discussed above, the uninterruptible-power-supply module 10 includes casters 15 that are rotatable on a surface for placement of the housing 12 (power conversion housing), and is configured to movably support the housing 12 (power conversion housing). Accordingly, when the uninterruptible-power-supply module 10 is replaced, the casters 15 rotate so that the uninterruptible-power-supply module 10 can be easily moved. Consequently, it is possible to reduce a burden of replacement of the uninterruptible-power-supply module 10.

Second Embodiment

Figure 8:
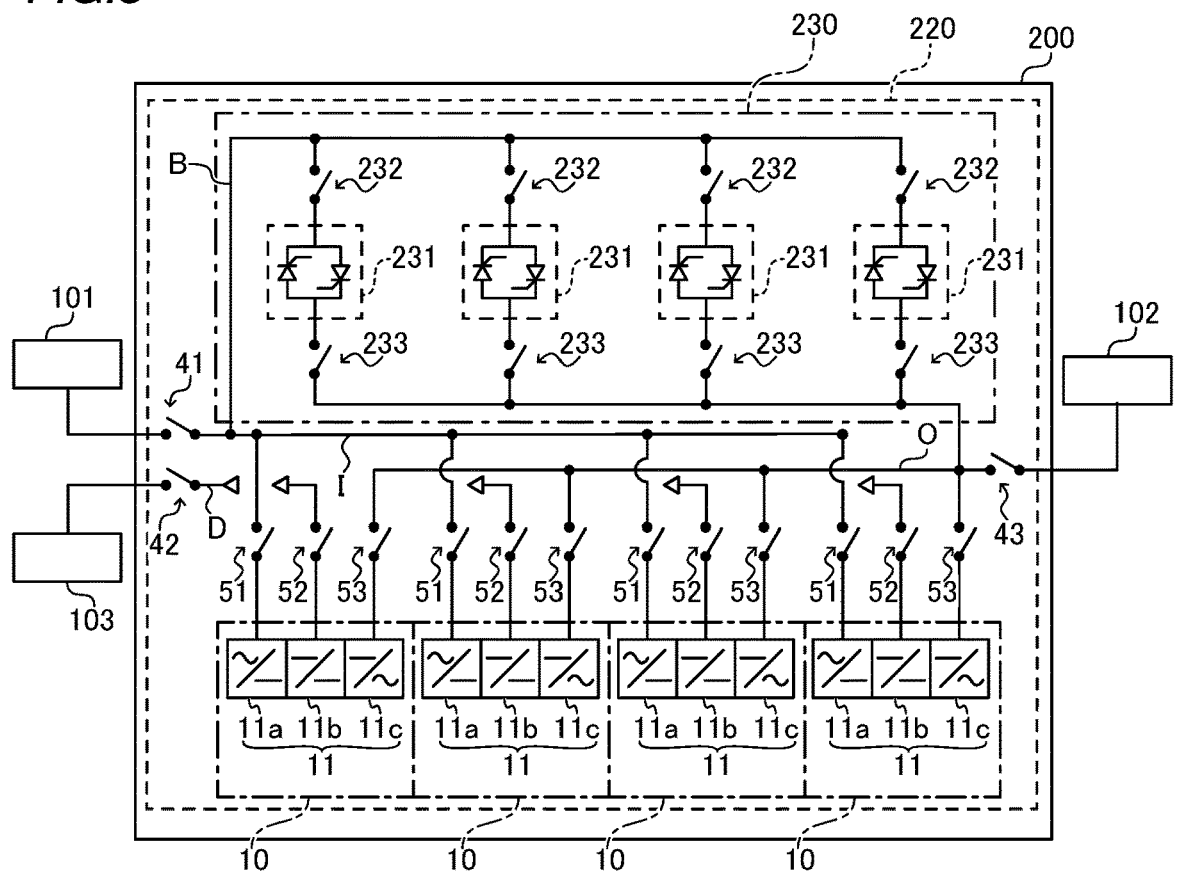
FIG. 8 is a circuit diagram showing an uninterruptible power supply according to a second embodiment of the present invention.
Figure 9:
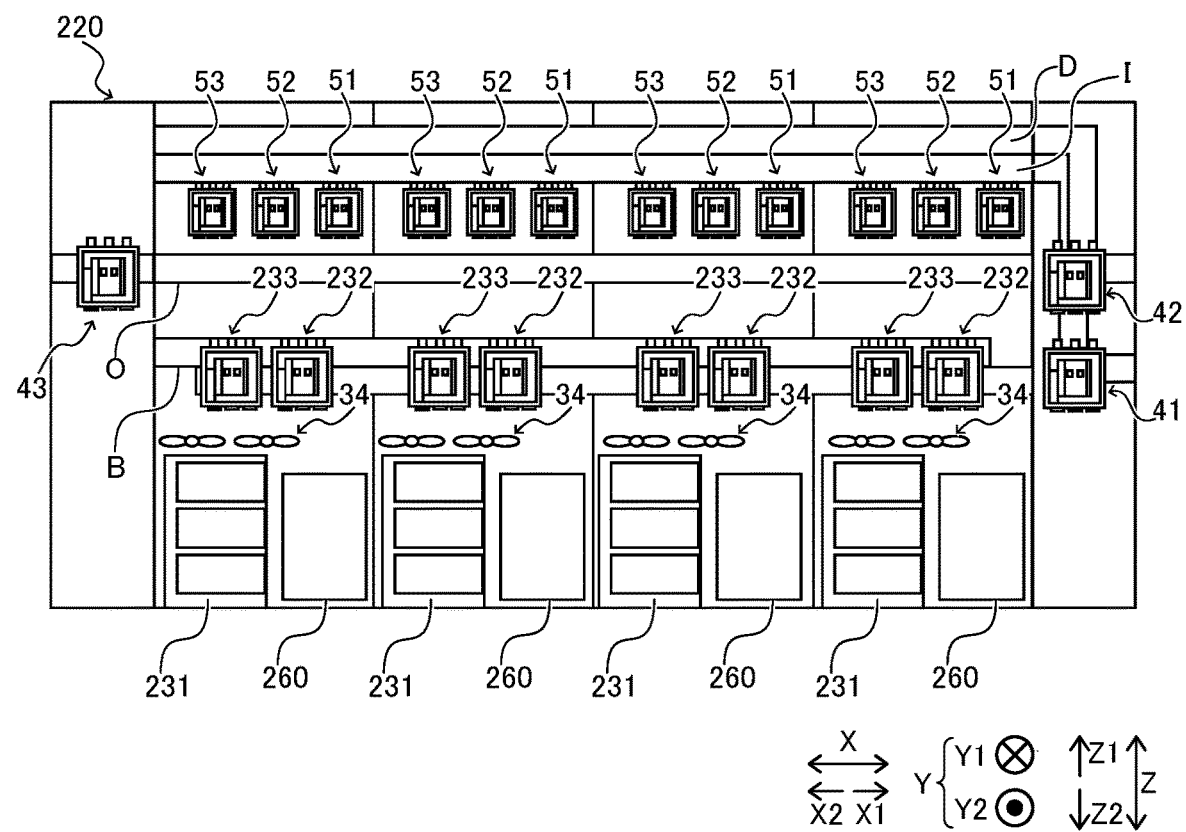
FIG. 9 is a diagram schematically showing the arrangement of the uninterruptible power supply according to the second embodiment of the present invention as viewed from a back surface side.

The following description describes configurations of an uninterruptible power supply 200 according to a second embodiment with reference to FIGS. 8 and 9. Dissimilar to the configuration of the first embodiment in which the bypass circuit part 30 includes one switching circuit 31, a bypass circuit part 230 according to the second embodiment includes a plurality of switching circuits 231. The same components as those of the first embodiment are denoted by the same reference numerals, and their description is omitted.

(Configuration of the Uninterruptible Power Supply According to Second Embodiment)

As shown in FIG. 8, the uninterruptible power supply 200 includes a housing-accommodating part 220 in the second embodiment. Similar to the housing-accommodating part 20 according to the first embodiment, the housing-accommodating part 220 is configured to replaceably accommodate a plurality of uninterruptible-power-supply modules (four uninterruptible-power-supply modules) 10. Similar to the first embodiment, the housing-accommodating part 220 includes the bus part (bus I, bus O and bus D), and the interrupters 51 to 53. The uninterruptible power supply 200 has areas that are provided on both sides in the leftward/rightward direction of the housing-accommodating part 220 so that one of the areas can be connected to the AC power supply 101 and the battery 103, and another area can be connected to the load 102.

In the second embodiment, the bypass circuit part 230 is arranged in the housing-accommodating part 220. The bypass circuit part 230 includes a plurality of switching circuits (four switching circuits) 231 switching electrical conduction. Similar to the bypass circuit part 30 according to the first embodiment, the bypass circuit part 230 is configured to supply AC power from the AC power supply 101 to the load 102 without connection through the uninterruptible-power-supply modules 10. Each switching circuit 231 has a configuration similar to the switching circuit 31 according to the first embodiment.

The bypass circuit part 230 includes a plurality of interrupters 232 and interrupters 233. Four sets of interrupters 232 and 233 are provided corresponding to the four switching circuits 231. Similar to the interrupter 32 and the interrupter 33 in the first embodiment, each set of interrupters 232 and 233 can electrically disconnect one of the plurality of switching circuits 231 from the bypass circuit part 230 (bus B).

In the second embodiment, the plurality of switching circuits 231 is connected in parallel to each other. In other words, the four switching circuits 231 are connected in parallel to each other between an input side (bus I side) of the bus B and an output side (bus O side) of the bus B. Each of the four switching circuits 231 includes the interrupter 232 and the interrupter 233 on the input side and the output side, respectively. The interrupter 232 and the interrupter 233 are an example of a "switching circuit interrupter" in the claims.

As shown in FIG. 9, the housing-accommodating part 220 includes four controllers 260 in the second embodiment. Each of the four switching circuits 231 and each of the four controllers 260 are arranged in a lower part side (Z2 direction side) of the housing-accommodating part 220 behind a back surface side (Y2 direction side) of one of the uninterruptible-power-supply modules 10.

Similar to the controller 60 in the first embodiment, the controllers 260 are configured to control power conversion of the power converters 11 of the uninterruptible-power-supply modules 10. Also, the controllers 260 are configured to control ON/OFF switching of the switching circuits 231 of the bypass circuit part 230. For example, each of the four controllers 260 is configured to control operation of one of the four uninterruptible power modules 10. For example, each of the four controllers 260 is configured to control switching operation of one of the four switching circuits 231. Also, the controllers 260 are configured to control opening/closing of the interrupters 232 and 233. The four controllers 260 are configured to be able to communicate with each other. The controller 260 includes a plurality of control boards similar to the controller 60 in the first embodiment. Control of the uninterruptible power modules 10 and switching circuits 231 by the controllers 260 is similar to the first embodiment.

Similar to the switching circuit 31 in the first embodiments, the switching circuit 231 is configured to be replaceable when being electrically disconnected by the interrupters 232 and 233. In a case in which the switching circuit 231 is electrically disconnected for maintenance/inspection including replacement, the uninterruptible power supply 200 can operate in the inverter power supply mode, or can operate in the commercial power supply mode by using the switching circuits 231 that are not disconnected in the plurality of switching circuits 231.

The other configuration of the second embodiment is similar to the first embodiment.

Advantages of Second Embodiment

In the second embodiment, the following advantages are obtained.

In the second embodiment, as discussed above, the bypass circuit part 230 includes a plurality of switching circuits 231 (four switching circuits), and a plurality of sets (four sets) of interrupters 232 and 233 (switching circuit interrupters) each set of which is configured to electrically disconnect one of the plurality of switching circuits 231. Accordingly, because the bypass circuit part 230 includes a plurality of switching circuits 231, even if fault occurs in one of the plurality of switching circuits 231, other switching circuits 231 in which no fault occurs can be used to switch between supplying AC power from the uninterruptible-power-supply modules 10 to the load 102 and supplying AC power from the Ac power supply 101 (bypass AC power supply) to the load 102 without connection through the uninterruptible-power-supply modules 10 while preventing instantaneous interruption of power supplied to the load 102. Consequently, the uninterruptible power supply 200 can be more stably operated by providing the plurality of switching circuits 231 to the bypass circuit part 230. The other advantages of the second embodiment are similar to the first embodiment.

Modified Embodiment

Note that the embodiments disclosed this time must be considered as illustrative in all points and not restrictive. The scope of the present invention is not shown by the above description of the embodiments but by the scope of claims for patent, and all modifications within the meaning and scope equivalent to the scope of claims for patent are further included.

For example, while the example in which the bus part (bus I, bus O and bus D), the bypass circuit part 30 (230), and the interrupters 51 to 53 (module interrupters) are included in the housing-accommodating part 20 (220), which accommodates the uninterruptible-power-supply modules 10 has been shown in the aforementioned first and second embodiments, the present invention is not limited to this. In the present invention, the bus part, the bypass circuit part 30 (230), and the interrupters 51 to 53 (module interrupters) may be included in a bus arrangement part that does not accommodate the uninterruptible-power-supply modules 10. In other words, the uninterruptible-power-supply modules 10 may not be accommodated in a box-shaped housing to be covered by the housing, and may be connected to the bus part arranged behind the back surface side of the uninterruptible-power-supply modules 10. For example, plate-shaped components of the top and side surface sides of the housing-accommodating part 20 (220) may be omitted.

While the example in which the bypass circuit part 30 (230) is arranged in the housing-accommodating part 20 (220) has been shown in the aforementioned first and second embodiments, the present invention is not limited to this. In the present invention, the bypass circuit part 30 (230) may be included in the uninterruptible-power-supply module 10.

While the example in which the switching circuit 31 (231) of the bypass circuit part 30 (230) is configured to be replaceable when being electrically disconnected by the interrupters 32 (232) and 33 (233) has been shown in the aforementioned first and second embodiments, the present invention is not limited to this. In the present invention, the switching circuit 31 (231) may not be electrically disconnected by the interrupters 32 (232) and 33 (233).

While the example in which the four uninterruptible-power-supply modules 10 are provided has been shown in the aforementioned first and second embodiments, the present invention is not limited to this. In the present invention, three or less, or five or more uninterruptible power modules 10 may be provided.

While the example in which the bus part (bus I, bus O and bus D) is arranged behind the back surface side of uninterruptible-power-supply modules 10 in the housing-accommodating part 20 (220) has been shown in the aforementioned first and second embodiments, the present invention is not limited to this. In the present invention, the bus part (bus I, bus O and bus D) may be arranged above an upper surface side (top surface side) of the uninterruptible-power-supply modules 10.

While the example in which the bus part (bus I, bus O and bus D) is arranged in the upper part side of the housing-accommodating part 20 (220), and the switching circuit 31 (231) of the bypass circuit part 30 (230) is arranged in the lower part side of the housing-accommodating part 20 (220) behind the back surface side of uninterruptible-power-supply modules 10 has been shown in the aforementioned first and second embodiments, the present invention is not limited to this. In the present invention, the switching circuit 31 (231) of the bypass circuit part 30 (230) may be arranged in the upper part side of the housing-accommodating part 20 (220), and the bus part (bus I, bus O and bus D) may be arranged in the lower part side of the housing-accommodating part 20 (220) behind the back surface side of uninterruptible-power-supply modules 10.

While the example in which the connection part 14 (module-side connection part) and the conductor C (connecting-conductor part) are connected to each other on one side of the uninterruptible-power-supply module 10 in the leftward/rightward direction so that the bus part (bus I, bus O and bus D) is electrically connected to the uninterruptible-power-supply module 10 has been shown in the aforementioned first and second embodiments, the present invention is not limited to this. In the present invention, the connection part 14 may be arranged on the back surface side of the uninterruptible-power-supply module 10. In this arrangement, the connection part 14 may be directly connected to the bus part (bus I, bus O and bus D).

While the example in which the bus Ia (module-side AC input part), the bus Oa (module-side AC output part) and the bus Da extend in the leftward/rightward direction in the housing 12 (power conversion housing) in the uninterruptible-power-supply module 10 has been shown in the aforementioned first and second embodiments, the present invention is not limited to this. In the present invention, the bus Ia, the bus Oa and the bus Da may extend in the housing 12 in the upward/downward direction.

While the example in which the switching circuit 31 and the controller 60 (260) are arranged behind the back surface side of uninterruptible-power-supply modules 10 in the housing-accommodating part 20 (220) has been shown in the aforementioned first and second embodiments, the present invention is not limited to this. In the present invention, the switching circuit 31 and the controller 60 (260) may be arranged above an upper surface side (top surface side) of the uninterruptible-power-supply modules 10.

While the example in which four switching circuits 231 and four controllers 260 are provided corresponding to the four uninterruptible-power-supply modules 10 has been shown in the aforementioned second embodiment, the present invention is not limited to this. The number of switching circuits 231 may be different from the number of uninterruptible-power-supply modules 10. Even in a case in which a plurality of switching circuits 231 is provided, switching operation of the plurality of switching circuits 231 may be controlled by one controller 260.

While the example in which the uninterruptible power supply 100 (200) is placed in a data center in a server, etc., and supplies power to the server has been shown in the aforementioned first and second embodiments, the present invention is not limited to this. In the present invention, the uninterruptible power supply 100 (200) may be used for PCS (Power Conditioning System).

While the example in which the uninterruptible power supply 100 (200) is configured to be supplied with AC power in a 3-phase 4-wire system has been shown in the aforementioned first and second embodiments, the present invention is not limited to this. For example, the uninterruptible power supply 100 (200) may be configured to be supplied with AC power in a 3-phase 3-wire system. Alternatively, the uninterruptible power supply 100 (200) may be configured to be supplied with single-phase AC power.

While the example in which the bypass circuit part 30 (230) includes the switching circuit 31 (231) including a pair of thyristor units that is connected in parallel to each other with their polarities being opposite has been shown in the aforementioned first and second embodiments, the present invention is not limited to this. For example, the switching circuit 31 (231) may additionally include a mechanical switch that is connected in series or in parallel to the pair of thyristor units, which is connected in parallel to each other with their polarities being opposite. A switching element such as an IGBT (Insulated Gate Bipolar Transistor) may be used instead of the thyristor.

While the example in which AC power is supplied from the same AC power supply 101 both in a case in which AC power from the uninterruptible-power-supply modules 10 is supplied to the load 102 (inverter power supply mode), and in a case in which AC power is supplied to the load 102 without connection through the uninterruptible-power-supply modules 10 (commercial power supply mode) has been shown in the aforementioned first and second embodiments, the present invention is not limited to this. For example, in the case in which AC power is supplied to the load 102 without connection through the uninterruptible-power-supply modules 10, the load 102 may be supplied with AC power supplied from a bypass AC power supply that is separately provided from the AC power supply 101. In other words, the bypass circuit part 30 (230) may be supplied with AC power from the bypass AC power supply that is different from the AC power source 101.

While the example in which the uninterruptible power supply 100 (200) is operated in the commercial power supply mode when the uninterruptible-power-supply module 10 is electrically disconnected has been shown in the aforementioned first and second embodiments, the present invention is not limited to this. For example, in a case in which a plurality of uninterruptible power modules 10 is provided, if one of the uninterruptible-power-supply modules 10 is replaced, the uninterruptible power supply 100 (200) is operated in the inverter power supply mode by using the other uninterruptible-power-supply modules 10.

What is claimed is:
1. An uninterruptible power supply comprising:
an uninterruptible-power-supply module that includes a power converter configured to convert AC power supplied from an AC power supply outside the uninterruptible power supply and to supply converted AC power to a load outside the uninterruptible power supply, and a power conversion housing accommodating the power converter;
a bus part that is arranged outside the power conversion housing of the uninterruptible-power-supply module, and is configured to input/output power from/to the uninterruptible-power-supply modules;
a module interrupter that is provided between the uninterruptible-power-supply module and the bus part, and is configured to electrically disconnect the uninterruptible-power-supply module as a whole from the bus part; and
a bypass circuit part that includes a switching circuit for switching electrical conduction, and is configured to supply AC power from a bypass AC power supply to the load without connection through the uninterruptible-power-supply module,
wherein
the uninterruptible-power-supply module includes a module-side connection part that is electrically connected to the bus part on one side in a leftward/rightward direction of the power conversion housing, and
the module-side connection part is electrically connected to the bus part through a connecting-conductor part that extends from a front surface side toward a back surface side of the power conversion housing.

2. The uninterruptible power supply according to claim 1 further comprising a housing-accommodating part that is configured to replaceably accommodate the uninterruptible-power-supply module, and includes the bus part and the module interrupter.

3. The uninterruptible power supply according to claim 2, wherein
the bypass circuit part is arranged in the housing-accommodating part; and
the switching circuit of the bypass circuit part includes an uninterruptible switching circuit that is configured to switch between supplying AC power from the uninterruptible-power-supply module to the load and supplying AC power from the bypass AC power supply to the load without connection through the uninterruptible-power-supply module while preventing instantaneous interruption of power supplied to the load.

4. The uninterruptible power supply according to claim 3, wherein
the housing-accommodating part includes a switching circuit interrupter configured to electrically disconnect the switching circuit from the bypass circuit part; and
the switching circuit is configured to be replaceable while being electrically disconnected by the switching circuit interrupter.

5. The uninterruptible power supply according to claim 4, wherein the bypass circuit part includes a plurality of switching circuits as the switching circuit, and a plurality of switching circuit interrupters each of which is configured to electrically disconnect each of the plurality switching circuits as the switching circuit interrupter.

6. The uninterruptible power supply according to claim 2, wherein
a plurality of uninterruptible-power-supply modules is provided as the uninterruptible-power-supply module;
the plurality of uninterruptible-power-supply modules is arranged in a leftward/rightward direction in the housing-accommodating part; and
a plurality of module interrupters is provided as the module interrupter corresponding to the plurality of uninterruptible-power-supply modules.

7. The uninterruptible power supply according to claim 2, wherein
the bus part includes an AC input bus part that is configured to be supplied with AC power from the AC power supply, and an AC output bus part that is configured to supply AC power from the power converter of the uninterruptible-power-supply module;
the AC input bus part and the AC output bus part are arranged behind a back surface side of the uninterruptible-power-supply module in the housing-accommodating part; and
the module interrupter is configured to electrically disconnect the uninterruptible-power-supply module as a whole from the AC input bus part and the AC output bus part.

8. The uninterruptible power supply according to claim 7, wherein
the bypass circuit part is arranged in the housing-accommodating part;
the AC input bus part and the AC output bus part are arranged in the housing-accommodating part at an upper part behind the back surface side of the uninterruptible-power-supply module; and the switching circuit of the bypass circuit part is arranged in the housing-accommodating part at a lower side behind the back surface side of the uninterruptible-power-supply module.

9. An uninterruptible power supply comprising:

an uninterruptible-power-supply module that includes a power converter configured to convert AC power supplied from an AC power supply outside the uninterruptible power supply and to supply converted AC power to a load outside the uninterruptible power supply, and a power conversion housing accommodating the power converter;

a bus part that is arranged outside the power conversion housing of the uninterruptible-power-supply module, and is configured to input/output power from/to the uninterruptible-power-supply modules;

a module interrupter that is provided between the uninterruptible-power-supply module and the bus part, and is configured to electrically disconnect the uninterruptible-power-supply module as a whole from the bus part;

a bypass circuit part that includes a switching circuit for switching electrical conduction, and is configured to supply AC power from a bypass AC power supply to the load without connection through the uninterruptible-power-supply module; and a housing-accommodating part that is configured to replaceably accommodate the uninterruptible-power-supply module, and includes the bus part and the module interrupter, wherein the bus part includes an AC input bus part that is configured to be supplied with AC power from the AC power supply, and an AC output bus part that is configured to supply AC power from the power converter of the uninterruptible-power-supply module;

the AC input bus part and the AC output bus part are arranged behind a back surface side of the uninterruptible-power-supply module in the housing-accommodating part; and the module interrupter is configured to electrically disconnect the uninterruptible-power-supply module as a whole from the AC input bus part and the AC output bus part, the uninterruptible-power-supply module includes a module-side connection part that is electrically connected to the AC input bus part and the AC output bus part on one side in a leftward/rightward direction of the power conversion housing;

the module-side connection part is electrically connected to the AC input bus part and the AC output bus part through a connecting-conductor part that extends from a front surface side toward the back surface side of the uninterruptible-power-supply module; and the module interrupter is configured to electrically disconnect the AC input bus part and the AC output bus part from the connecting-conductor part whereby electrically disconnecting the uninterruptible-power-supply module as a whole from the AC input bus part and the AC output bus part.

10. The uninterruptible power supply according to claim 7, wherein the uninterruptible-power-supply module includes a module-side AC input part that is electrically connected to the AC input bus part, which is arranged in the housing-accommodating part, and a module-side AC output part that is electrically connected to the AC output bus part, which is arranged in the housing-accommodating part; and the module-side AC input part and the module-side AC output part extend in a leftward/rightward direction in the power conversion housing.

11. The uninterruptible power supply according to claim 2, wherein the power converter of the uninterruptible-power-supply module is configured to convert DC power supplied from a battery outside the uninterruptible power supply into AC power and to supply converted AC power to the load outside the uninterruptible power supply;

the bus part includes a DC input bus part that is supplied with the DC power from the battery;

the DC input bus part is arranged behind a back surface side of the uninterruptible-power-supply module in the housing-accommodating part; and the module interrupter is configured to electrically disconnect the uninterruptible-power-supply module as a whole from the DC input bus part.

12. The uninterruptible power supply according to claim 2, wherein the housing-accommodating part includes a controller that is configured to control power conversion of the power converter of the uninterruptible-power-supply module; and the controller is arranged behind a back surface side of the uninterruptible-power-supply module in the housing-accommodating part.

13. The uninterruptible power supply according to claim 2, wherein the bypass circuit part is arranged in the housing-accommodating part; and the housing-accommodating part includes a cooling fan that is configured to cool the switching circuit of the bypass circuit part.

14. The uninterruptible power supply according to claim 2, wherein the housing-accommodating part accommodates the interruptible-power supply module therein such that the uninterruptible-power-supply module is replaced by drawing the uninterruptible-power-supply module to a front surface side thereof.

15. The uninterruptible power supply according to claim 1, wherein the uninterruptible-power-supply module includes a caster that is rotatable on a surface for placement of the power conversion housing to movably support the power conversion housing.

* * * * *